W. R. HUME.
MOLDING OF CONCRETE PRODUCTS.
APPLICATION FILED FEB. 12, 1920.
1,390,134.
Patented Sept. 6, 1921.
2 SHEETS—SHEET 1.
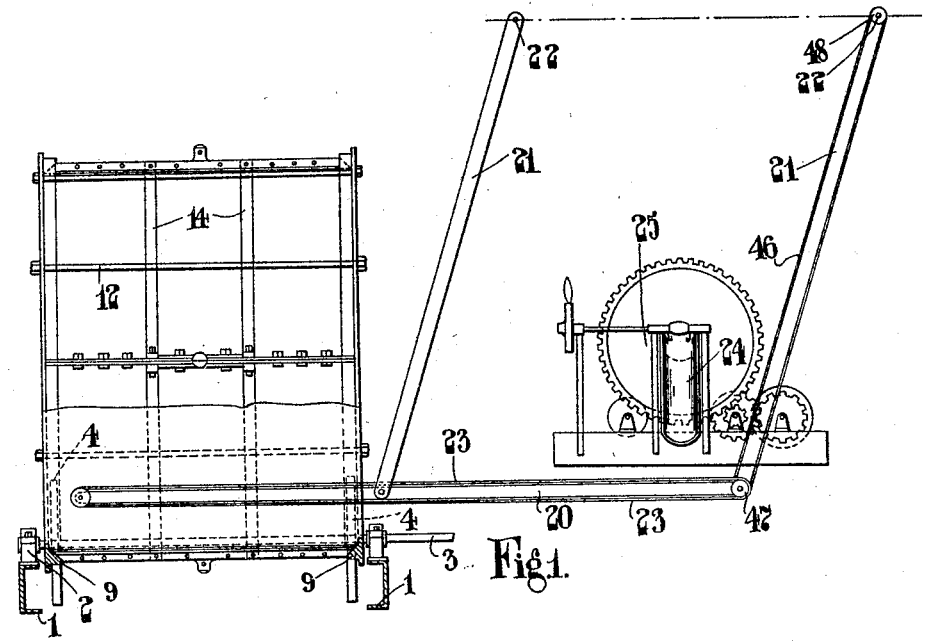
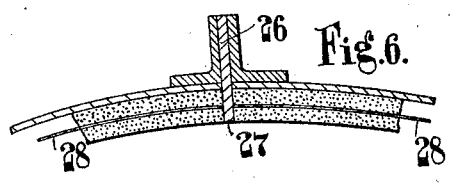
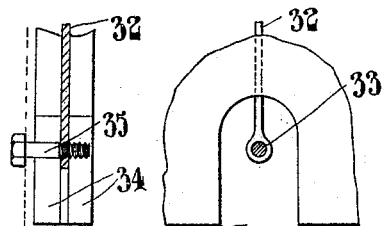
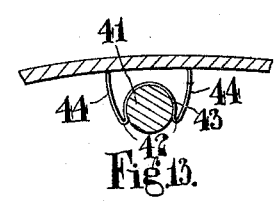
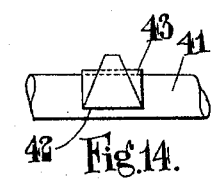
Inventor
W. R. Hume,
By H. R. Kerslake.
Attorney W. R. HUME.
MOLDING OF CONCRETE PRODUCTS.
APPLICATION FILED FEB. 12, 1920.
1,390,134.
Patented Sept. 6, 1921.
2 SHEETS—SHEET 2.
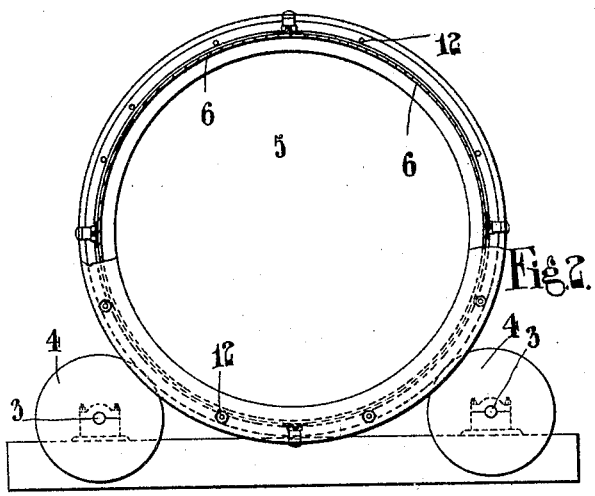
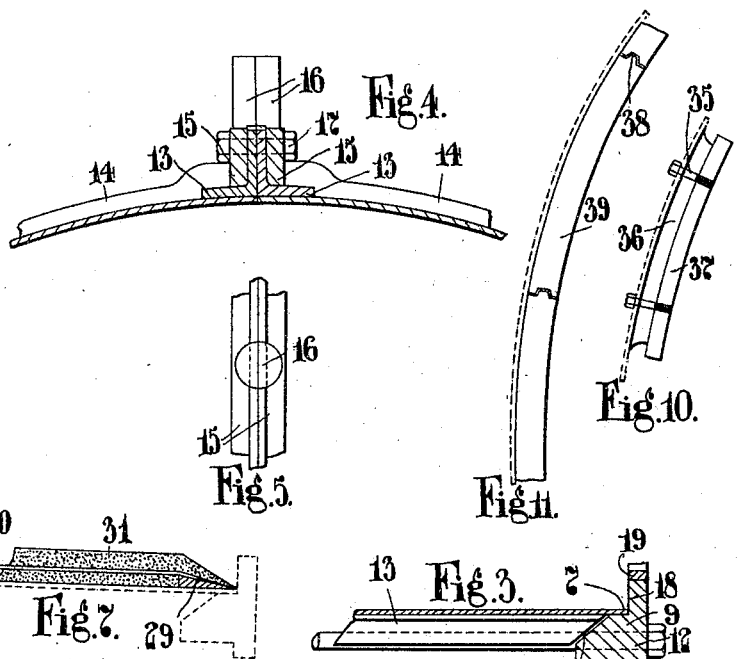
Inventor
W. R. Hume,
By H. P. Kerslake.
Attorney

UNITED STATES PATENT OFFICE.

WALTER REGINALD HUME, OF ADELAIDE, SOUTH AUSTRALIA, AUSTRALIA, ASSIGNOR TO HUME PIPE & CONCRETE CONSTRUCTION COMPANY, LIMITED, OF LONDON, ENGLAND.

MOLDING OF CONCRETE PRODUCTS.

1,390,134.  Specification of Letters Patent.  Patented Sept. 6, 1921.

Application filed February 12, 1920. Serial No. 358,204.

*To all whom it may concern:*

Be it known that I, WALTER REGINALD HUME, a subject of the King of Great Britain and Ireland, and residing at Flinders street, Adelaide, State of South Australia, Commonwealth of Australia, have invented certain new and useful Improvements in or Relating to the Molding of Concrete Products, of which the following is a specification.

This invention relates to the molding of concrete products by machinery of the type in which centrifugal force is employed to distribute, pack and consolidate the concrete material in cylindrical or like rotating molding casings.

In connection with such appliances it has been proposed to form moderate sized pipes, conduits and the like in a series of cylindrical molds formed of resilient or hinged metal casings having a longitudinal joint and provided with flanged retaining rings at each end, said molds being adapted to be supported upon a series of rotatably mounted circular rollers engaging the retaining rings, and by means of which driving power is transmitted from one mold to another by frictional contact with the periphery of said rings.

The object of the present invention is to provide apparatus capable of dealing with products of greater capacity and for which considerable volumes and weights of concrete are required.

The invention consists in a concrete molding machine of the type indicated, in which retaining rings situated at each end of a molding casing and adapted to be frictionally driven by means of supporting rollers are provided with inclined centering surfaces to facilitate the assembly of a plurality of subsequently connected sections constituting a molding casing of large dimensions and suitable for the reception of a considerable body of concrete.

The invention further consists in methods of operating and appliances adapted to facilitate the handling of large bodies of concrete and products of considerable weight, and to increase the quality, strength and utility of the articles produced.

The invention also consists in the improvements in or relating to the manufacture of concrete products as hereinafter described.

Referring now to the accompanying more or less diagrammatic drawings:—

Figure 1 is a side elevation partially in section of a concrete molding machine in accordance with this invention.

Fig. 2 is an end elevation of the machine shown in Fig. 1.

Fig. 3 is an enlarged sectional view of part of a retaining ring and the adjacent casing section.

Figs. 4 and 5 show a detail of the reinforcing frame or cage for the molding casing.

Fig. 6 shows in section a longitudinal joint of the molding casing with a separating plate inserted for forming a concrete shell in two or more portions.

Fig. 7 is a detail showing the formation of a penetrating or cutting edge for tubular members adapted to be sunk or driven into the ground.

Figs. 8 and 9 are details to an enlarged scale showing the method of exposing the reinforcement for the purpose of connecting together two sections of a well, caisson or other continuous tubular member.

Fig. 10 shows a coring piece for forming apertures in a casing or shell.

Fig. 11 shows a method of dividing a shell into a number of interlocking portions.

Fig. 12 shows a method of inserting circumferential rings so as to form short cylinders, collars or the like, and Figs. 13 and 14 show a spring clip for positioning the ends of reinforcement, say, in the neighborhood of apertures or the other positions.

In the convenient embodiment of the invention shown in Figs. 1 and 2, 1, 1 are frame members carrying pedestals 2, 2, in which are supported shafts 3, 3, provided with supporting rollers 4, 4, upon which the molding casing is carried. One or more of the shafts 3 may be extended as shown in Fig. 1 for transmitting power to the machine.

The molding casing 5 is formed of four or any other desirable number of sections 6 of a cylindrical casing, said sections being assembled by inserting their ends 7 in the conical or inclined centering surfaces 8 of the retaining rings 9 situated at each end of the casing.

The retaining rings 9 are provided with cylindrical trackways 10 for running upon the rollers 4 and with flanges 11 for holding the casing upon said rollers, and through the body of the rings pass eight or other convenient number of longitudinal bolts 12 for drawing the rings together and securely retaining the sections 6.

The sections to form a casing are readily assembled by placing one of the retaining rings upon a horizontal floor to form a support for the sections which are inserted therein and then held together by the second ring which is placed upon the top when the sections are all in position, the centering surfaces 8 forming a ready means for gathering the sections into their correct positions. When both rings are positioned, the longitudinal edges of the sections 6 which are provided with angle irons 13 may be connected by one or two bolts inserted adjacent to the retaining rings at each end of the casing, and the casing may then be encircled by a strengthening frame or cage formed of stout circumferential bars 14 connected by longitudinal bars 15 abutting against the backs of the angles 13 and provided at least upon two opposite sides of the casing with abutting semi-cylindrical portions 16 which form together trunnions by means of which the complete casing may be readily handled by a crane or other suitable appliance.

The strengthening frame or cage is preferably made in as many parts as there are sections forming the complete casing, the parts being connected by bolts 17 passing through the longitudinal bars 15 and the intervening angle irons 13 of the casing sections.

When the strengthening frame is in position the bolts 12 may be inserted and the complete casing is then ready to be placed upon the rollers 4, which may be accomplished by a crane or the like carrying suitable slinging means for engaging the trunnions 16 and allowing the casing to be turned when hoisted for lowering upon the rollers.

The retaining rings 9 have internal flanges 18 of a width equivalent to the thickness of the concrete shells or the like which are to be formed in the mold and said flanges are also adapted to receive detachable rings 19 which increase the depth of the flange to a sufficient extent to allow of the percentage of surplus water which is present in the concrete and which is expelled by the consolidating action and disposed of after removal of the rings 19 before the concrete shell is finished.

For depositing the large body of concrete evenly within the molding casing a frame 20 supported upon two parallel pendulum links 21 pivotally mounted at the points 22 is arranged to move more or less horizontally in and out of the molding casing during its revolution, the frame 20 being provided with an endless traveling band 23 which passes beneath the outlet chute 24 of a concrete mixer 25 positioned at a convenient location adjacent to the molding machine.

The concrete is fed from the mixer continuously on to the band and the frame 20 swinging upon the links 21 is moved in and out during the slow rotation of the molding casing in order to distribute the concrete evenly and at such a speed that the balance of the rotating mold will not be upset. The endless band 23 is conveniently driven by a belt 46 carried upon pulleys 47 and 48 at opposite ends of the outermost link 21.

The speed of the mold during the depositing of the concrete will be sufficient to distribute it by centrifugal force in equal thickness all over the interior surface of the casing within which there will have previously been positioned any desired reinforcing rods or wires say of the type described in my Patent No. 21627/1913 or any other suitable type.

As soon as the desired quantity of concrete has been deposited in the mold the speed may be increased to consolidate the concrete and expel the surplus liquid so as to effect a thorough packing of the concrete around the reinforcement and perfectly even distribution of the required thickness all over the molding casing.

When this has been accomplished and the initial set of the concrete has taken place, the machine may be stopped for removal of the rings 19 to allow the surplus liquid to drain away. After this the machine is again set in motion while the interior of the concrete shell is finished in a suitable manner by surfacing tools of any convenient form.

Where it is desired to form a concrete shell in two halves or other desired number of pieces corresponding with the number of sections of the molding casing, dividing plates 26 as shown in Fig. 6 may be inserted at the longitudinal joints when the casing is being put together, said plates projecting from the interior surface of the mold an amount as shown at 27 equal to the thickness of the concrete shell which is to be formed.

In these circumstances the circumferential reinforcement 28 will be stopped short at the dividing plates and the ends of such reinforcement may be exposed as hereinafter more fully described for the purpose of joining two or more portions to form a cylinder if desired.

For wells, caissons or like structures which are to be lowered or driven into the ground, a reinforced penetrating edge may be provided as shown in Fig. 7 said edge having a beveled metal or like band or ring 29 preferably attached to the ends of the longitudinal reinforcing members 30. The band is inserted in the molding casing with the reinforcement and the edge of the concrete 31 may be chamfered to meet the edge of the band say, for example, by a beveled molding surface attached to the flange 18 of the retaining ring 9, or by any other suitable and convenient means.

When forming cylindrical lengths which are to be joined end to end to form a well, caisson or the like, or whenever it is desired to join two semi-cylindrical or other divided portions together, the reinforcing members may be provided with rings, hooks or the like at the ends adjacent to the parts to be joined, and these ends may be exposed by forming pockets as shown in Figs. 8 and 9. In the embodiment illustrated a reinforcing member 32 has a ring 33 formed at its end and upon each side of the reinforcement core pieces 34 of a combined thickness equal to the thickness of the concrete shell are positioned and held against the molding casing by a screw-threaded member 35 passing through the outer core piece and engaging the inner one by means of its threaded portion. Such core pieces may be withdrawn from the molding casing with the finished shell after removal of the threaded member 35, and when the concrete is thoroughly dried they may be removed to expose the reinforcement which is then conveniently connected to similarly exposed reinforcement of the adjacent concrete member by links, wire lacing or any other suitable means.

In some instances as, for example, caissons or similar structures, it is desirable to form apertures into which frames may be inserted, say for the reception of glass or any other material, said frames being conveniently fitted in a rabbet or recess provided around the edge of the apertures. Suitable cores for this purpose are shown in Fig. 10, the outer core part 36 being placed against the inner surface of the molding casing and the inner core part 37 being provided with tapped holes engageable by bolts 35 for holding the core in position in the molding casing.

The core part 36 in the embodiment illustrated is formed with a curved edge in order to provide a rounded surface to the aperture on the outside of the finished shell.

In some instances it may be desirable to form apertures in a concrete shell which taper from a larger dimension upon the inner side to a smaller dimension upon the outer side, or to form cavities upon the inner surface which do not penetrate completely through the thickness, as for example, for exposing reinforcement on the inside for connecting other matter thereto.

In these circumstances tapered core pieces may be fastened with their largest ends against bars or similar members which extend through the molding casing from one retaining ring to the other, said bars being turned over at their ends in order that they may be secured to the outer faces of the retaining rings. The bars may also be employed for holding core blocks which do not contact with the surface of the molding casing and will thus form only a cavity on the inner surface of a concrete shell. Such bars are readily detachable when the molding machine is stopped for the removal of the rings 19 and getting rid of the superfluous liquid, the cores being attached to them by screws such as 35 which are withdrawn before the removal of the bars. The interior of the concrete shell may thus be finished in the ordinary way and the core parts removed after the concrete is dried.

Fig. 11 shows a method of dividing a concrete shell into a number of curved interlocking sections as may be desirable for tunnels, large underground conduits or the like. In this case channel shaped members 38 are arranged longitudinally of the molding casing to divide the circumference into a series of curved portions 39, the members 38 being detachably connected to the flanges 18 of the retaining rings 9; the channel shaped members remaining in position until the portions 39 are sufficiently dried to be removed from the molding casing.

Fig. 12 shows a method of dividing up the molding casing by means of circumferential plates in order to form short cylinders, collars or the like. In this arrangement flat annular dividing rings 40 are inserted in the molding casing so that their outer periphery is in contact with the inner surface of the casing and the dividing rings are held in position longitudinally of the molding casing by means of the reinforcing members 41 contacting with the dividing plate upon each side.

Where reinforcing members are stopped at apertures or at the ends of the casing without being connected in any way which would prevent their contacting with the interior of the casing, said reinforcing members may be conveniently retained in their correct position by spring clips 42 shown in Figs. 13 and 14. The clips are made with a circumferential portion 43 adapted to grip a reinforcing bar 41 and with turned ends or arms 44 adapted to contact with the inner surface of the molding casing and to retain the reinforcement in its correct position against the centrifugal force which would tend to throw it against the casing.

Having now particularly described and ascertained the nature of my said invention and in what manner the same is to be performed, I declare that what I claim is:—

1. A concrete molding machine including a cylindrical molding casing adapted to contain a considerable body of concrete and comprising a plurality of sections, retaining rings situated at each end of the molding casing with recesses for receiving said sections and supporting rollers adapted to drive frictionally the cylindrical casing by contact with said retaining rings.

2. A concrete molding machine including a cylindrical molding casing, retaining rings situated at each end of the molding casing, supporting rollers adapted to drive frictionally the cylindrical casing, an endless band conveyer means, a more or less horizontal member carrying said conveyer, parallel pendulum links supporting said member so that one end thereof is movable along the length of the mold, a concrete mixer adjacent to the other end of said conveyer for feeding concrete thereto and driving means carried by one of said links and receiving power from the stationary pivoted end thereof.

3. A concrete molding machine including a cylindrical molding casing, retaining rings situated at each end of the molding casing, supporting rollers adapted to drive frictionally the cylindrical casing, detachable rings inserted within the internal flange of each of the retaining rings for retaining a sufficient body of the concrete mixture prior to the separation of liquid therefrom, and means for rotating the mold at graduated speeds to carry out the various stages of the deposition and consolidation of the concrete, removal of liquid and final finishing.

4. A concrete molding machine including a cylindrical molding casing, retaining rings situated at each end of the molding casing, supporting rollers adapted to drive frictionally the cylindrical casing, and an encircling and strengthening frame or cage formed of united circumferential and longitudinal members provided with trunnions or the like for swinging or otherwise manipulating a heavy casing.

5. A machine for molding concrete having reinforcement embedded therein, including a cylindrical molding casing, retaining rings situated at each end of the molding casing, supporting rollers adapted to drive frictionally the cylindrical casing, attachment means formed on the ends of reinforcing bars and coring means comprising a divided block sandwiched on said attachment means to expose them for connecting the reinforcement of component sections to form a continuous structure.

6. A machine for molding concrete having reinforcement embedded therein, including a cylindrical molding casing, retaining rings situated at each end of the molding casing, supporting rollers adapted to drive frictionally the cylindrical casing, attachment means formed on the ends of reinforcing bars, a pair of core pieces of combined thickness equal to the material of the cylinder and positioned upon opposite sides of the attachment means, and a screw-threaded member connecting said core pieces to the inside of the mold and engaging the inner core piece by means of screw threads.

7. A concrete molding machine including a cylindrical molding casing, retaining rings situated at each end of the molding casing, supporting rollers adapted to drive frictionally the cylindrical casing, two part core pieces of combined thickness equal to that of the material, the inner one being of larger dimensions than the other, and one or more threaded members connecting said core pieces to the inside of the mold for forming apertures with stepped or rabbeted edges.

8. A concrete molding machine including a cylindrical molding casing, retaining rings situated at each end of the molding casing, supporting rollers adapted to drive frictionally the cylindrical casing, longitudinal bars or the like detachably fastened to the retaining rings and positioned inside the thickness of the concrete and cores of larger dimensions upon the inner than upon the outer surface attached to said longitudinal bars for forming apertures or cavities which do not necessarily completely penetrate the material.

9. A machine for molding concrete having reinforcement embedded therein, including a cylindrical molding casing, retaining rings situated at each end of the molding casing, supporting rollers adapted to drive frictionally the cylindrical casing and a beveled molding surface attached to the flange of the retaining ring for forming a chamfered concrete edge and positioning a beveled metal or like ring embedded therein to form a penetrating edge for wells, caissons or the like.

10. A concrete molding machine including a cylindrical molding casing, retaining rings situated at each end of the molding casing, supporting rollers adapted to drive frictionally the cylindrical casing, and dividing plates projecting into the mold an amount equal to the thickness of the concrete at the longitudinal joints to form a concrete shell in two or more portions.

11. A concrete molding machine including a cylindrical molding casing, retaining rings situated at each end of the molding casing, supporting rollers adapted to drive frictionally the cylindrical casing, and a plurality of channeled dividing members running longitudinally of the molding casing to form a cylindrical concrete shell in a number of interlocking curved sections or slabs.

12. A machine for molding concrete having reinforcement embedded therein, including a cylindrical molding casing, retaining rings situated at each end of the molding casing, supporting rollers adapted to drive frictionally the cylindrical casing, and a number of annular rings inserted in the length of the mold contacting upon their outer periphery with the interior of the casing and positioned longitudinally by intervening reinforcement for the production of reinforced concrete collars or rings.

13. A machine for molding concrete having reinforcement embedded therein, including a cylindrical molding casing, retaining rings situated at each end of the molding casing, supporting rollers adapted to drive frictionally the cylindrical casing, and spring clips adapted more or less to surround and grip the wire and having projections adapted to contact with the casing and to hold the reinforcement at a desired distance therefrom.

14. A machine for molding concrete having reinforcement embedded therein, including a cylindrical molding casing, retaining rings situated at each end of the molding casing, supporting rollers adapted to drive frictionally the cylindrical casing, spring clips adapted more or less to surround and grip the wire and having projections adapted to contact with the casing and to hold the reinforcement at a desired distance therefrom, two-part core pieces of combined thickness equal to that of the material, the inner one being of larger dimensions than the other, and one or more threaded members connecting said core pieces to the inside of the mold for forming apertures with stepped or rabbeted edges.

15. A machine for molding concrete having reinforcement embedded therein, including a cylindrical molding casing, retaining rings situated at each end of the molding casing, supporting rollers adapted to drive frictionally the cylindrical casing, hooks, eyes, or like attachment means formed on the ends of reinforcing bars, coring means such as a divided block sandwiched on said hooks, eyes or the like to expose them for connecting the reinforcement of component sections and a beveled molding surface attached say to the flange of the retaining ring for forming a chamfered concrete edge and positioning a beveled metal or like ring embedded therein to provide a penetrating edge for wells, caissons or the like formed as a continuous structure from component sections.

16. A machine for molding concrete having reinforcement embedded therein, including a cylindrical molding casing, retaining rings situated at each end of the molding casing, supporting rollers adapted to drive frictionally the cylindrical casing, spring clips adapted more or less to surround and grip the wire and having projections adapted to contact with the casing and to hold the reinforcement at a desired distance therefrom, and dividing plates projecting into the mold an amount equal to the thickness of the concrete at the longitudinal joints to form a concrete shell in two or more portions.

17. A concrete molding machine including a cylindrical molding casing, retaining rings situated at each end of the molding casing, supporting rollers adapted to drive frictionally the cylindrical casing and an encircling and strengthening frame or case, said rings having inclined centering surfaces, said molding casing comprising sections adapted to be connected and mounted upon said inclined surfaces, the molding casing being sufficiently large to receive a considerable body of concrete and said strengthening frame or cage being formed of united circumferential and longitudinal members provided with trunnions or the like for swinging or otherwise manipulating a heavy casing.

In testimony whereof I have signed my name to this specification.

WALTER REGINALD HUME.